UNITED STATES PATENT OFFICE.

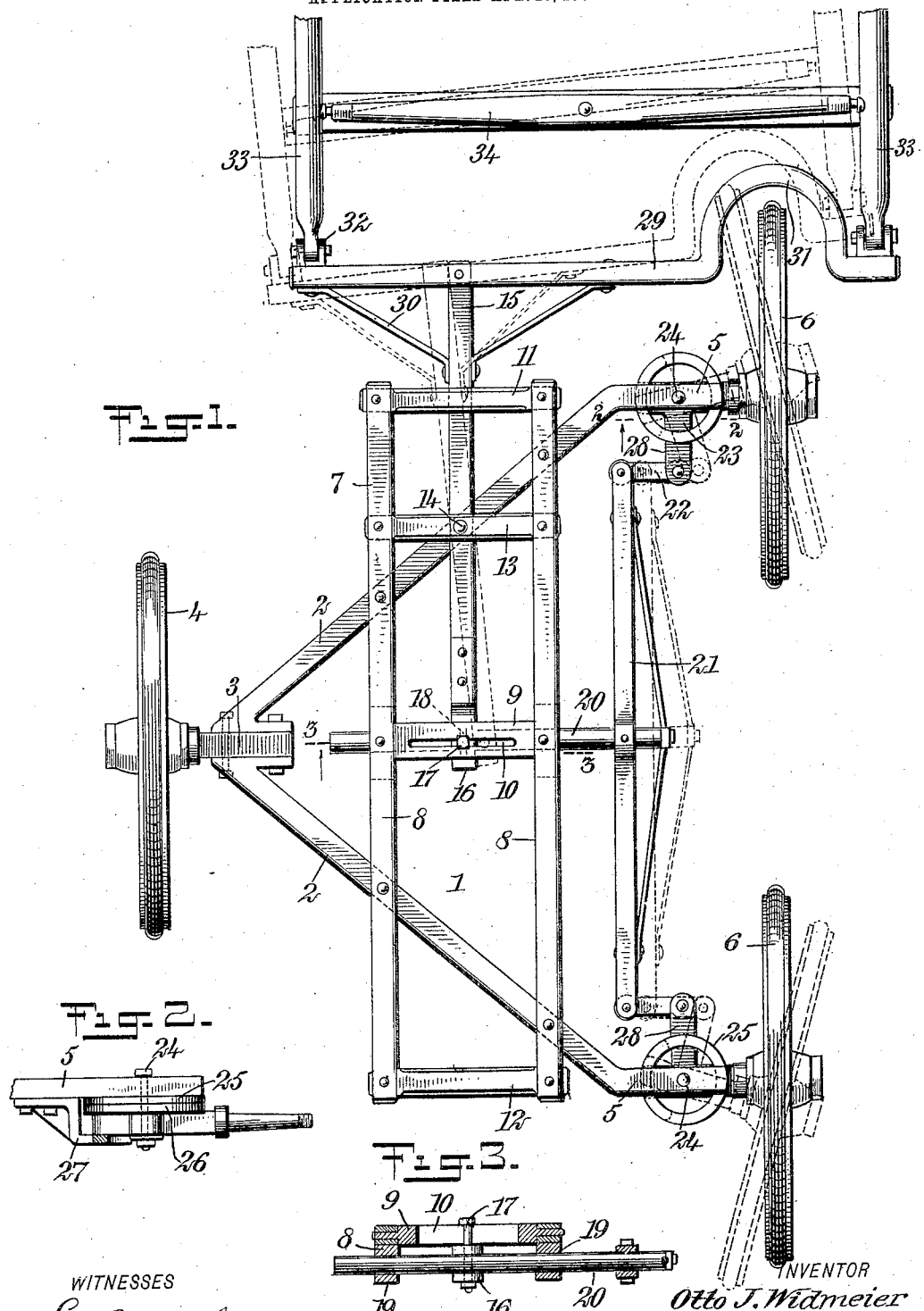

OTTO JOSEPH WIDMEIER, OF SIGEL, ILLINOIS.

VEHICLE.

No. 844,982.  Specification of Letters Patent.  Patented Feb. 19, 1907.

Application filed April 26, 1906. Serial No. 313,856.

*To all whom it may concern:*

Be it known that I, OTTO JOSEPH WIDMEIER, a citizen of the United States, and a resident of Sigel, in the county of Shelby and State of Illinois, have invented a new and Improved Vehicle, of which the following is a full, clear, and exact description.

This invention relates to vehicles.

In driving on country roads where the roads are bad it becomes inconvenient for a single-horse team to pass along the road by reason of the fact that most of the vehicles which pass are double-horse teams. The horses of the double teams wear two paths or tracks in the roadway, and the intermediate space becomes very rough, upon which space the horse, if it were a one-horse vehicle, must pass.

The object of this invention is to provide a vehicle which will overcome this objection and which will be constructed so that the horse drawing the same may walk in a position displaced laterally with respect to the central line of the vehicle. In this way he may pass in one of the beaten tracks referred to above.

A further object is to accomplish this with a construction which will minimize the side draft.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures.

Figure 1 is a plan showing the frame of a vehicle constructed according to my invention, a portion of the shafts being represented as broken away. Fig. 2 is a cross-section on the line 2 2 of Fig. 1, and Fig. 3 is a cross-section on the line 3 3 of Fig. 1.

Referring more particularly to the parts, 1 represents the frame of the vehicle. The body of this frame is composed of two transversely-disposed beams 2, which are connected so as to present substantially the form of a V, as indicated in Fig. 1. In the angle between the connected extremities of these beams an arm 3 is attached, carrying a wheel 4. The opposite extremities of the beams 2 are formed with substantially parallel extensions 5, which extend at right angles to the direction in which the vehicle advances, and these extensions 5 are formed with the usual arms carrying wheels 6.

Attached to the upper side of the beams 2 I provide an auxiliary frame 7, of substantially rectangular form, presenting oppositely-arranged longitudinal stringers 8, which extend in a front and rear direction of the vehicle. This auxiliary frame 7 is disposed between the wheel 4 and the wheels 6. The auxiliary frame 7 is symmetrically placed with respect to the axis of the wheel 4—that is, it extends substantially the same distance forwardly as it does rearwardly. Near their middle points the bars 8 are connected by a transverse bar or brace 9, and this brace is provided with a longitudinally-disposed slot 10. The extremities of the auxiliary frame 7 are formed by cross-bars 11 and 12, and an intermediate cross-bar 13 is arranged in the front portion of the auxiliary frame. The middle point of this cross-bar 13 intersects the forwardly-disposed beam 2, as shown, and at this point a stout pivot-bolt or pin-bolt 14 is arranged, which affords means for attaching a movable tongue 15, the said tongue extending rearwardly, as shown, and being provided with a yoke 16 at its rear extremity for a purpose which will appear hereinafter. From this yoke a bolt 17 extends upwardly and passes through the slot 10, so as to constitute a guide. The yoke 16 is provided with slots 18, which are disposed longitudinally of the tongue and through which the aforesaid bolt 17 passes.

On the under sides of the stringers 8 I provide bearings 19, through which there is slidably mounted a slide-bar 20, and this slide-bar carries the aforesaid pin 17. The right extremity of this bar projects laterally from the auxiliary frame 7 and carries rigidly a cross-head 21, which extends longitudinally with respect to the vehicle-body. At the extremities of this cross-head 21 links 22 are attached, which links attach to knuckles 23, said knuckles 23 carrying the aforesaid wheel 6 and being rotatably mounted on vertical pivot-bolts 24, as shown. The arrangement for mounting these wheels 6 is most clearly shown in Fig. 2.

On the under sides of the extensions 5 referred to above rings 25 are respectively attached, and against the under sides of these rings similar rings 26 press, said rings 26 being rigidly attached to the knuckles 23, as shown. In this way a large bearing-surface is formed and a durable construction results.

Adjacent to the rings 25 and 26 brackets 27 are arranged, which are attached to the under sides of the extensions 5, and these brackets engage the under sides of the knuckles 23 so as to assist in holding the same in position, relieving the strain upon the bolts 24. In order to facilitate the attachment of the links 22 to the knuckles 23, I provide the said knuckles with inwardly-projecting arms 28, to which the links attach directly.

To the forward extremity of the tongue 15 a cross-bar 29 is rigidly attached, the same being made rigid by means of angle-braces 30, as indicated. The left side of this cross-bar is quite short, while the right side extends beyond the adjacent wheel 6, being formed into a bow 31, so as to clear the forward edge of this wheel, as shown. At the extremities of the cross-bar 29 thill-couplings 32 are arranged, which afford means for attaching the shafts 33. The shafts 33 support a swingletree 34 of any common construction.

From inspection of Fig. 1 it will be evident that the horse within the shafts 33 is disposed toward the right and in substantially the same position as the right-hand horse of a double team, considered with respect to the wheels of the vehicle.

The mode of operation of the construction described is substantially as follows: Supposing that the horse is to be turned toward the left, the shafts 33 will then move into the position in which they are indicated in dotted lines. This operation displaces toward the right the rear extremity of the tongue 15. In this way the cross-head 21 is projected toward the right. This movement of the cross-head 21 rotates the knuckles 23 in opposite directions, so that the forward one of the wheels 6 will take substantially the position in which it is shown in dotted lines, tending to move toward the left, while the rear wheel takes an opposite position, tending to move toward the right. In this way the durability of the vehicle is much increased. If the horse should move toward the right, the rear extremity of the tongue 15 will move toward the left, and the wheels 6 will throw themselves into a position reversed with respect to that shown in the dotted lines.

Evidently when the vehicle is proceeding in a straight course along the road the horse will not be obliged to travel in the unbroken center of the road, and the wheels of the vehicle will run in the wheel-ruts.

Having thus described my invention, I claim as new and desire to secure by Letters Patent—

1. In a vehicle, in combination, a frame, a pair of wheels on one side of said frame and supporting the same, a single wheel on the opposite side of said frame, a tongue pivotally attached to said frame to swing laterally in a substantially horizontal plane, a laterally-displaced cross-bar attached to said tongue and carrying shafts, and a connection from said tongue to said pair of wheels for controlling the same.

2. In a vehicle, in combination, a frame, knuckles attached thereto at one side, wheels carried respectively by said knuckles, a third wheel carried by the opposite side of said frame and rotating in a plane fixed with respect to said frame, a slide-bar, means for guiding the same to move transversely of said frame, and a connection between said slide-bar and said knuckles for controlling the wheels carried by said knuckles.

3. In a vehicle, in combination, a frame, knuckles pivotally attached thereto and carrying wheels, a tongue pivotally attached to said frame, a slide-bar mounted transversely in said frame, a cross-head carried by said slide-bar, links connecting said cross-head with said knuckles, a connection between said tongue and said slide-bar, and a crossbar attached to said tongue forwardly and carrying the shafts.

4. In a vehicle, in combination, a frame, a knuckle attached to said frame on one side and forwardly, a wheel carried by said knuckle, a tongue pivotally attached to said frame, a cross-bar carried by said tongue and having a bow formed therein receiving the forward edge of said wheel, and a connection from said tongue to said knuckle for controlling said wheel.

5. In a vehicle, in combination, a frame, knuckles pivotally attached thereto, wheels carried by said knuckles, a tongue pivotally attached to said frame and connected with the shafts, a transverse cross-bar in said frame and having a slot therein extending transversely of said frame, a slide-bar transversely guided on said frame, a bolt passing upwardly from said slide-bar and passing through said slot, said tongue having a slot also receiving said bolt, and a connection between said slide-bar and said knuckles for controlling said wheels.

In testimony whereof I have signed my name to this specification in the presence of two subscribing witnesses.

OTTO JOSEPH WIDMEIER.

Witnesses:
ANTON ZUMBAHLEN,
WM. RUEPKE.